US010567645B2

United States Patent
Shukla et al.

(10) Patent No.: US 10,567,645 B2
(45) Date of Patent: Feb. 18, 2020

(54) METHOD AND APPARATUS FOR CAPTURING VIDEO DATA

(71) Applicant: Samsung Electronics Co., Ltd., Suwon-si, Gyeonggi-do (KR)

(72) Inventors: Alok Shankarlal Shukla, Bangalore (IN); Sathish Chalasani, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/979,905

(22) Filed: May 15, 2018

(65) Prior Publication Data

US 2018/0338081 A1 Nov. 22, 2018

(30) Foreign Application Priority Data

May 17, 2017 (IN) .............................. 201741017337
Apr. 16, 2018 (IN) .............................. 201741017337

(51) Int. Cl.
*H04N 5/232* (2006.01)
*H04N 5/225* (2006.01)
(Continued)

(52) U.S. Cl.
CPC ....... *H04N 5/23232* (2013.01); *H04N 5/2258* (2013.01); *H04N 5/2355* (2013.01);
(Continued)

(58) Field of Classification Search
CPC ........... H04N 5/23232; H04N 5/35581; H04N 5/2258; H04N 9/09; H04N 5/23293; H04N 5/23216
See application file for complete search history.

(56) References Cited

U.S. PATENT DOCUMENTS 6,788,338 B1 9/2004 Dinev et al.
8,571,355 B2 10/2013 Lee et al.
(Continued)

FOREIGN PATENT DOCUMENTS

KR 10-1675117 B1 11/2016
WO 2016/025161 A1 2/2016

OTHER PUBLICATIONS

Bray; Sony Xperia XZ Premium review: Ultra slow-mo camera is fun but the design of this phone is flawed; Mobile Phones; http://www.expertreviews.co.uk/sony/1405933/sony-xperia-xz-premiumreview-ultra-slow-mo-camera-is-fun-out-the-design-of-this-phone; Jun. 9, 2017.
(Continued)

*Primary Examiner* — Shahbaz Nazrul
(74) *Attorney, Agent, or Firm* — Jefferson IP Law, LLP

(57) ABSTRACT

A method for generating video data using an imaging device is provided. The method includes capturing, by a first sensor of the imaging device, a first set of sub-sampled monochrome frames, capturing, by a second sensor of the imaging device, a second set of sub-sampled color frames, reconstructing one or more high resolution monochrome frames using the first set of sub-sampled monochrome frames, and generating one or more high speed high resolution color frames based on the second set of sub-sampled color frames and the reconstructed one or more high resolution monochrome frames.

20 Claims, 10 Drawing Sheets

(51) Int. Cl.
*H04N 5/235* (2006.01)
*H04N 5/355* (2011.01)
*H04N 5/345* (2011.01)
*H04N 9/09* (2006.01)

(52) U.S. Cl.
CPC ......... *H04N 5/345* (2013.01); *H04N 5/35581* (2013.01); *H04N 9/09* (2013.01); *H04N 5/23216* (2013.01); *H04N 5/23293* (2013.01)

(56) References Cited

U.S. PATENT DOCUMENTS

| | | | |
|---|---|---|---|
| 9,319,585 B1* | 4/2016 | Liu | H04N 9/07 |
| 9,414,037 B1 | 8/2016 | Solh | |
| 9,894,298 B1* | 2/2018 | Solh | H04N 5/23293 |
| 2003/0048493 A1 | 3/2003 | Pontifex et al. | |
| 2010/0201831 A1* | 8/2010 | Weinstein | H04N 9/045 |
| | | | 348/221.1 |
| 2013/0342740 A1* | 12/2013 | Govindarao | H04N 9/09 |
| | | | 348/262 |
| 2014/0320602 A1* | 10/2014 | Govindarao | H04N 9/045 |
| | | | 348/46 |
| 2016/0182821 A1* | 6/2016 | Shabtay | H04N 5/2258 |
| | | | 348/239 |
| 2017/0078546 A1* | 3/2017 | Bezot | H04N 5/2258 |
| 2017/0118407 A1* | 4/2017 | Cho | H04N 5/23232 |
| 2017/0180681 A1* | 6/2017 | Okita | H04N 9/045 |
| 2017/0318273 A1* | 11/2017 | Mantzel | H04N 1/3871 |
| 2018/0041742 A1* | 2/2018 | Stetson | H04N 9/045 |

OTHER PUBLICATIONS

International Search Report dated Aug. 29, 2018, Application: PCT/KR2018/005597; filed May 16, 2018.

* cited by examiner

METHOD AND APPARATUS FOR CAPTURING VIDEO DATA

CROSS-REFERENCE TO RELATED APPLICATION(S)

This application is based on and claims priority under 35 U.S.C. § 119(a) to an Indian provisional patent application filed on May 17, 2017, in the Indian Patent Office and assigned Serial number 201741017337, and to an Indian patent application filed on Apr. 16, 2018, in the Indian Patent Office and assigned Serial number 201741017337, the disclosure of each of which is incorporated by reference herein in its entirety.

BACKGROUND

1. Field

The disclosure relates to capturing video. More particularly, the disclosure relates to capturing high speed high quality video using dual sensors.

2. Description of the Related Art

High speed imaging refers to methods or techniques for taking images or videos of very fast events.

Images are captured in a shorter exposure window and lower exposure time causing light-starved conditions due to the prevalence of a high frame rate. Images are affected due to a lower sensitivity resulting from the light-starved condition.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for capturing high speed high quality video using dual sensors.

Additional aspects will be set forth in part in the description which follows and, in part, will be apparent from the description, or may be learned by practice of the presented embodiments.

In accordance with an aspect of the disclosure, a method for generating video data using an imaging device is provided. The method includes capturing, by a first sensor of the imaging device, a first set of sub-sampled monochrome frames, capturing, by a second sensor of the imaging device, a second set of sub-sampled color frames, reconstructing one or more high resolution monochrome frames using the first set of sub-sampled monochrome frames, and generating one or more high speed high resolution color frames based on the second set of sub-sampled color frames and the reconstructed one or more high resolution monochrome frames.

In an embodiment, the one or more high resolution monochrome frames are used as a guide for color propagation in the one or more high speed high resolution color frames.

In an embodiment, the one or more high resolution monochrome frames is reconstructed using a flexible sub-sampled readout (FSR) mechanism.

In an embodiment, the second set of sub-sampled color frames is more sparsely sub-sampled than the first set of sub-sampled monochrome frames.

In an embodiment, the method includes the first sensor is a monochrome sensor and the second sensor is a Bayer sensor.

In an embodiment, reconstructing the one or more high resolution monochrome frames from the first set of sub-sampled monochrome frames further includes capturing a plurality of parity fields from the first sensor of the imaging device using a multi parity FSR mechanism, wherein the imaging device is in an FSR mode. The method further includes reconstructing the one or more high resolution monochrome frames from the plurality of parity fields using an FSR reconstruction, wherein the FSR reconstruction utilizes one of a pre-image signal processor (ISP) FSR reconstruction and a post-ISP FSR reconstruction based on a bandwidth capacity of an ISP of the imaging device.

In accordance with another aspect of the disclosure, an imaging device for generating video data, is provided. The imaging device includes a first sensor configured to capture a first set of sub-sampled monochrome frames, a second sensor configured to capture a second set of sub-sampled color frames, and a processor coupled to the first sensor and the second sensor, the processor being configured to reconstruct one or more high resolution monochrome frames using the first set of sub-sampled monochrome frames, and generate one or more high speed high resolution color frames based on the second set of sub-sampled color frames and the reconstructed one or more high resolution monochrome frames.

Other aspects advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
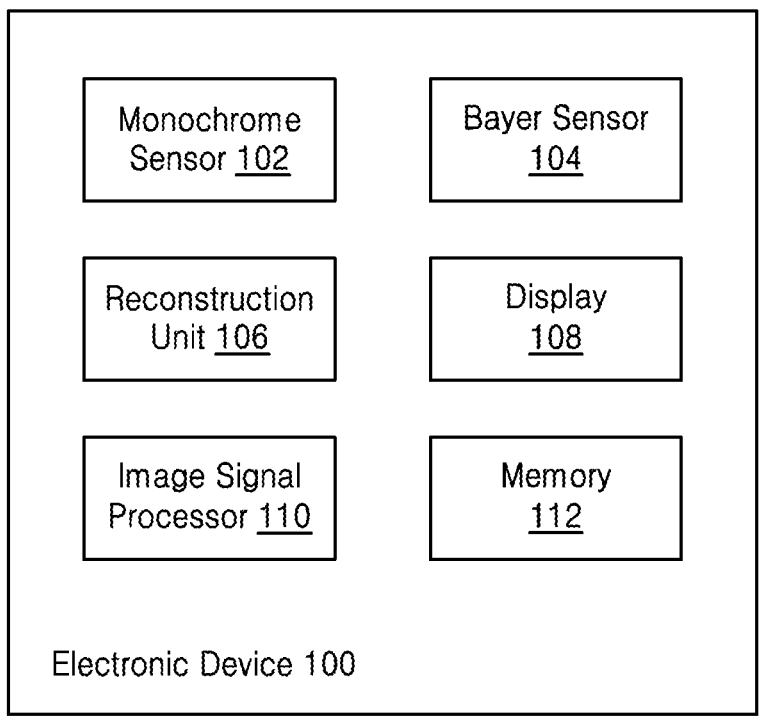
FIG. 1 illustrates various hardware components of an electronic device with a dual sensor for high speed imaging, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It may be advantageous to set forth definitions of certain words and phrases used throughout this document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this document, and those of ordinary skill in the art should understand that in many, if not most instances, such definitions apply to prior, as well as future uses of such defined words and phrases.

Currently, maximum achievable frame-rate for a motion capturing imaging device is limited by pixel readout rate of an imaging sensor of the imaging device. The imaging sensors used currently may allow either a slow frame-rate at full resolution (for example, 30 frames per second (fps) at ultra high definition (UHD) resolution or a fast frame-rate at low resolution (for example, 120 fps at full high definition (FHD) resolution). Higher frame-rates can be achieved using pixel readout modes such as sub-sampling, binning or the like but usage of the pixel readout modes sacrifices spatial for temporal resolution within a fixed bandwidth.

While higher frame rate can be achieved at a lower resolution, a field of view with respect to the captured image is affected. Also, dynamic changing of a region of interest is also difficult to achieve at a lower resolution. Other limitations of existing methods of high speed image capture include poor multiple camera synchronization of dual views. High speed imaging requires higher international standards organization (ISO) settings. Higher ISO results in noisier or grainy images.

Using dual color-monochrome sensors for high speed imaging also results in differing image characteristics. For example, the color sensor can have greater resolution loss compared to the monochrome sensor. The monochrome sensor captures more light giving better brightness, less noise and better resolution.

Thus, there is a need for a dual sensor mechanism that addresses the shortcomings of conventional techniques of high speed imaging. The above information is presented as background information only to help the reader to understand the disclosure. Applicants have made no determination and make no assertion as to whether any of the above might be applicable as prior art with regard to the present application.

FIG. 1 illustrates various hardware components of an electronic device with a dual sensor for high speed imaging, according to an embodiment of the disclosure.

Referring to FIG. 1, an electronic device 100 includes a monochrome sensor 102, a Bayer sensor 104, a reconstruction unit 106, a display 108, an image signal processor (ISP) 110 and a memory 112. The reconstruction unit 106 and the ISP 110 may be implemented as one hardware processor. The electronic device 100 can include an input/output (I/O) interface (not shown) that can be but is not limited to a web interface, a graphical user interface for the display 108, an interface for the Bayer sensor 104 and the monochrome sensor 102 and the like. The I/O interface can communicate with other devices or a system through a communication network. The communication network can include a data network such as, but not limited to, an Internet, local area network (LAN), wide area network (WAN), metropolitan area network (MAN) etc. In another embodiment, the communication network can include a wireless network, such as, but not limited to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. Accordingly, the electronic device 100 is equipped with communication components facilitating communications over the communication network. In some embodiments, the electronic device 100 can be part of an Internet of things (IoT) network.

The monochrome sensor 102 may capture a set of sub-sampled monochrome frames of a subject. The Bayer sensor 104 may capture a set of sub-sampled Bayer frames of the subject using multiple parity flexible sub-sampled readout (FSR) to generate a plurality of parity fields. The parity fields pertaining to the Bayer data are at a lower resolution relative to the monochrome data. The monochrome data and the Bayer data can be stored in the memory 112. In another embodiment, the memory 112 can be a circular memory. Whenever an image is to be captured by a user using the high speed imaging method according to an embodiment of the disclosure, the user can use any gesture such as a tap on the I/O interface. The gesture may be detected as a trigger event that initiates the reconstruction mechanism. The reconstruction unit 106 is configured to fetch the parity fields pertaining to the monochrome data and the Bayer data that lie within predefined time units around the trigger event stored in the memory 112. Upon detecting the trigger event, the Bayer data may be stored in the memory 112 and frozen in the memory 112 to prevent overwriting.

In another embodiment, the trigger event can also be detected automatically by analyzing motion in captured video frames. Automatic triggering of the event starts the capturing of high frame rate data from the monochrome sensor 102.

In another embodiment, the reconstruction unit 106 can perform de-mosaicing on the parity fields to generate high resolution monochrome frames and red green, and blue (RGB) frames, respectively.

The reconstruction unit 106 utilizes a pre-ISP FSR reconstruction and a post-ISP FSR reconstruction based on a bandwidth capacity of the ISP 110. The reconstruction unit 106 uses the sub-sampled monochrome frames as a guide for propagating color. The reconstruction unit 106 may reconstruct high resolution monochrome frames from the sub-sampled monochrome data and high speed high resolution color frames from the Bayer data and the high resolution monochrome frames.

In an implementation, the Bayer data is more sparsely sub-sampled than the monochrome data.

The ISP 110 can be, but is not limited to, a central processing unit (CPU), a microprocessor, or a microcontroller. The ISP 110 may be coupled to the memory 112, the monochrome sensor 102 and the Bayer sensor 104, and the display 108. The ISP 110 may execute sets of instructions stored on the memory 112.

The memory 112 includes storage locations to be addressable through the ISP 110. The memory 112 is not limited to a volatile memory and/or a non-volatile memory. Further, the memory 112 can include one or more computer-readable storage media. The memory 112 can include non-volatile storage elements. For example, non-volatile storage elements can include magnetic hard discs, optical discs, floppy discs, flash memories, or forms of electrically programmable memories (EPROM) or electrically erasable and programmable (EEPROM) memories. In an embodiment, the memory 112 can be a circular memory.

Figure 2:
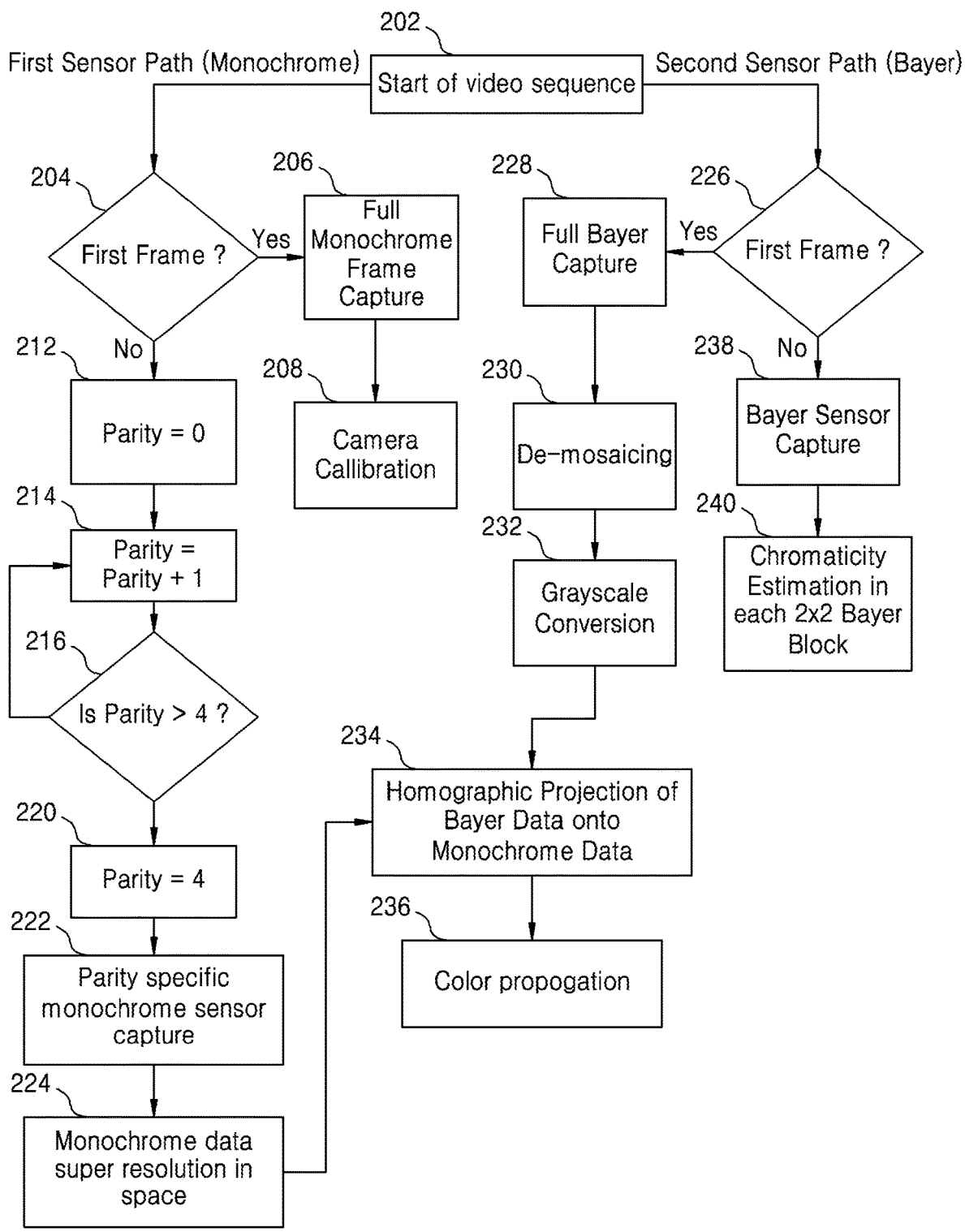
FIG. 2 is a flow chart illustrating a method for Bayer reconstruction from sparse sampled data with a dual sensor, according to an embodiment of the disclosure.

FIG. 2 is a flow chart illustrating a method for Bayer reconstruction from sparse sampled data with the dual sensor, according to an embodiment of the disclosure.

Referring to FIG. 2, in operation 202, the user triggers the image reconstruction through a triggering event such as a user input such as a gesture input, pushing a button, or an auto trigger input based on motion detection between image frames on the I/O interface of the electronic device 100. In operations 204 and 226, the monochrome sensor 102 and the Bayer sensor 104 initiate their respective sub-sampling mechanisms. In the first sensor path, as shown in FIG. 2, the reconstruction unit 106 receives the sub-sampled monochrome data from the monochrome sensor 102. The first monochrome frame is captured in full, in operation 206. The first frame is used as a reference to calibrate the monochrome sensor to enhance focus and sensitivity, in operation 208. In another embodiment, the first monochrome frame is captured without any subsampling and is used to calibrate the monochrome sensor 102.

Subsequent frames are captured through an FSR mechanism. The reconstruction unit 106 captures the plurality of parity fields pertaining to the monochrome sensor 102 of the electronic device 100. The plurality of parity fields provide spatial and temporal sampling of the full frame monochrome data. The plurality of parity fields capture the full frame monochrome data based on a multi parity FSR mechanism that utilizes a zigzag sampling pattern or the like. Further, the reconstruction unit 106 reconstructs the high speed high resolution monochrome frames from the plurality of parity fields using the FSR reconstruction, wherein the FSR reconstruction utilizes pre-ISP FSR reconstruction or post-ISP FSR reconstruction based on a bandwidth capacity of the ISP 110 of the electronic device 100.

In the multi parity FSR, each of the plurality of parity fields obtained, that captures the full frame data through sampling, is assigned a parity number iteratively, as shown in operations 212, 214, and 216. Further, each of the plurality of parity fields has a scaled frame size and a scaled frame rate that is obtained by using the zigzag sampling pattern or the like. The frame size of the parity fields is reduced by a scaling factor and the frame rate is enhanced by the scaling factor. The scaling factor is equal to a number of distinct parity patterns (each identified by a unique parity number) used by the zigzag sampling pattern or similar sampling patterns used. For example, if the maximum current imaging sensor read out frame rate is N, then the multi parity FSR enhances the frame rate to 'scaling factor times N" (scaling factor N). In FIG. 2, as an embodiment, a four parity field is considered. The four parity field (parity pattern) of the multi parity FSR has four distinct parity fields such as parity 1, parity 2, parity 3 and parity 4, which are repeated in sequence for the plurality of parity fields generated. Thus, the 4 parity readout increases the frame rate by factor 4 and reduces the frame size or resolution by four for each parity field, as per operations 220, 222, and 224 of FIG. 2. Similarly, a selection of an eight field parity can further increase the frame rate and reduce the frame size by scaling factor 8.

The plurality of parity fields capture the full frame monochrome data of the monochrome sensor 102 to provide sampled full frame monochrome data. The plurality of parity fields are stored in the memory 112. The memory 112 may retain the plurality of parity fields for a predefined time units for example (2N seconds) based on a first-in-first-out (FIFO) mechanism.

Once the parity fields are generated, the reconstruction unit 106 can be configured to reconstruct the high speed high resolution monochrome frames by applying the FSR reconstruction mechanism on the plurality of parity fields.

In an embodiment, the FSR reconstruction mechanism may utilize the pre-ISP FSR reconstruction when the ISP 110 has a low bandwidth capacity, where the FSR reconstruction for generating the high speed high resolution monochrome frames is performed before performing ISP processing.

In an embodiment, the FSR reconstruction is based on the post-ISP FSR reconstruction when the ISP 110 supports a higher bandwidth, where the FSR reconstruction generating the high speed high resolution monochrome frames is performed after the ISP processing.

In the second sensor path, as shown in FIG. 2, of operation 226, the first Bayer frame is captured and chromaticity is estimated in each Bayer block (operations 238 and 240). Subsequent frames are captured in full, in operation 228. The reconstruction unit 106 performs de-mosaicing on the Bayer data comprising captured Bayer frames to generate RGB frames, in operation 230. The de-mosaiced Bayer data can be previewed on a screen of the display 108. The de-mosaiced Bayer data may be converted to grayscale, in operation 232. In operation 234, the Bayer data is projected onto the homographic matrix determined for the monochrome data. Subsequently, the high resolution monochrome frames may be utilized as a guide for color propagation. In operation 236, the reconstruction unit 106 reconstructs high resolution image frames of the subject based on the high resolution monochrome frames and the Bayer data. The reconstructed frames are displayed on the display 108.

Figure 3:
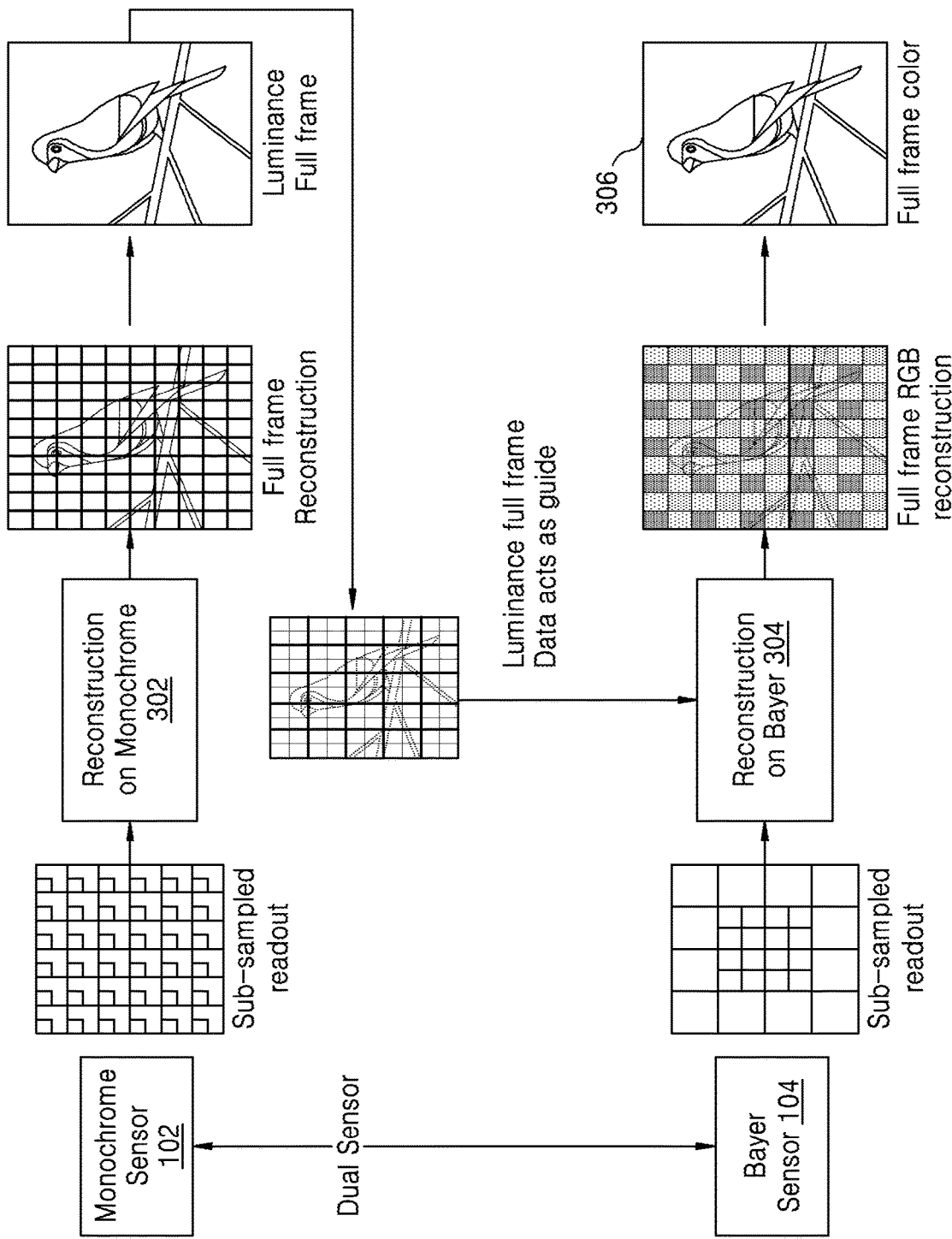
FIG. 3 illustrates a monochrome reconstruction and color propagation results, according to an embodiment of the disclosure.

FIG. 3 illustrates a monochrome reconstruction and color propagation results, according to an embodiment of the disclosure.

Referring to FIG. 3, the monochrome sensor 102 captures sub-sampled monochrome frames that are reconstructed as per operations 302 and 304 similar to operations of 204, 206, 208, 212, 214, 216, 220, 222, and 224 in FIG. 2. The high resolution monochrome frames act as a guide to the Bayer data to eventually reconstruct high resolution high speed image frames 306 of the subject.

Figure 4:
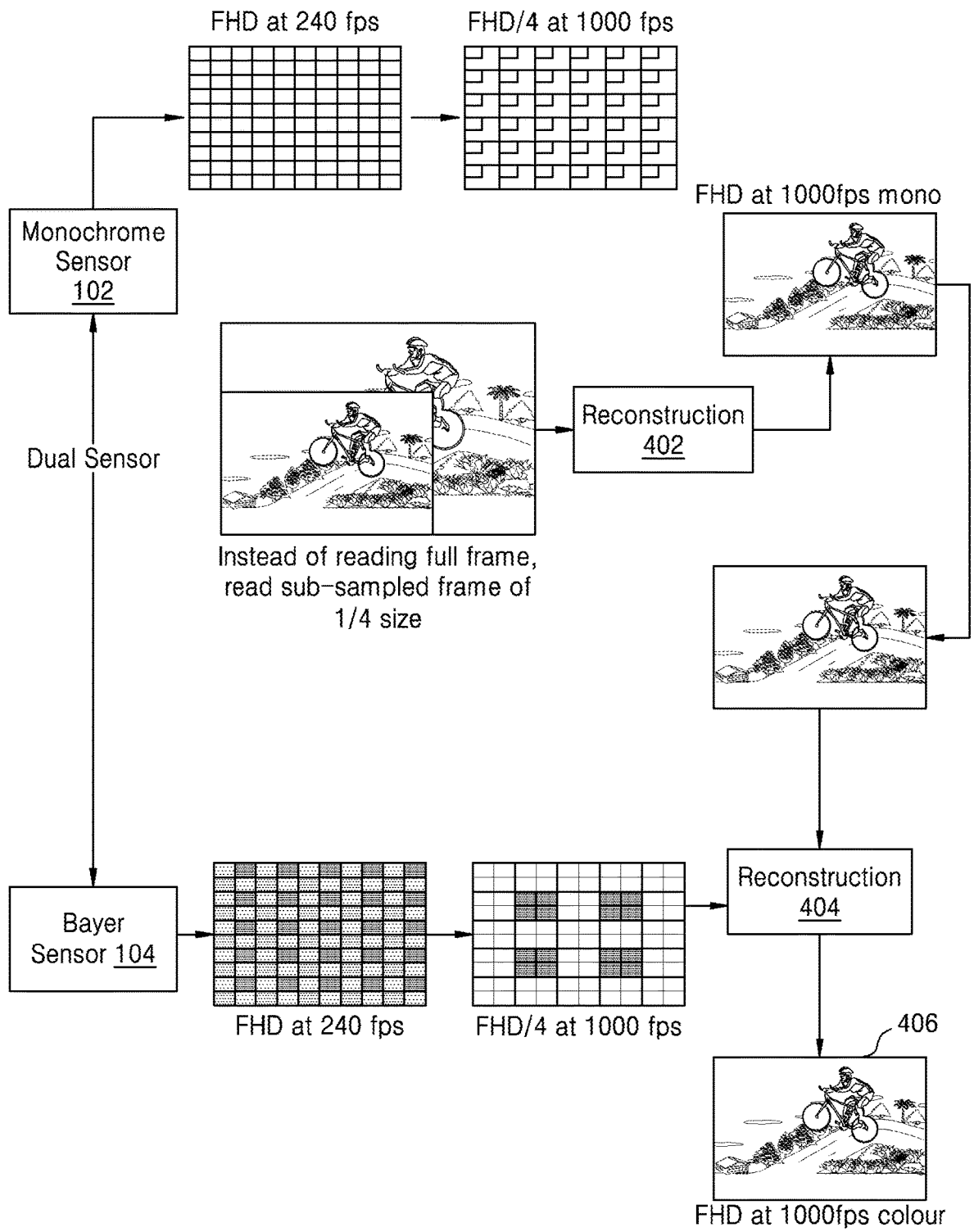
FIG. 4 is a high level overview of a system for capturing a high speed high quality video using a dual sensor, according to an embodiment of the disclosure.

FIG. 4 is a high level overview of a system for capturing a high speed high quality video data using a dual sensor, according to an embodiment of the disclosure.

Referring to FIG. 4, the monochrome sensor 102 captures FHD monochrome frames at 240 fps. Using the FSR mechanism described in connection with FIG. 2, the monochrome frames are reconstructed at 1000 fps with a parity number of four, in operation 402. The monochrome frames are read at a quarter size of the captured frames captured by the monochrome sensor 102. The Bayer data can also be read at a quarter size, i.e. at 1000 fps. The Bayer data is further de-mosaiced and converted to grayscale. The FHD monochrome frames at 1000 fps are used as a guide for color propagation in the Bayer frames, as seen in operation 404. The resultant reconstructed color frames 406 are of high resolution (at 1000 fps color).

Figure 5:
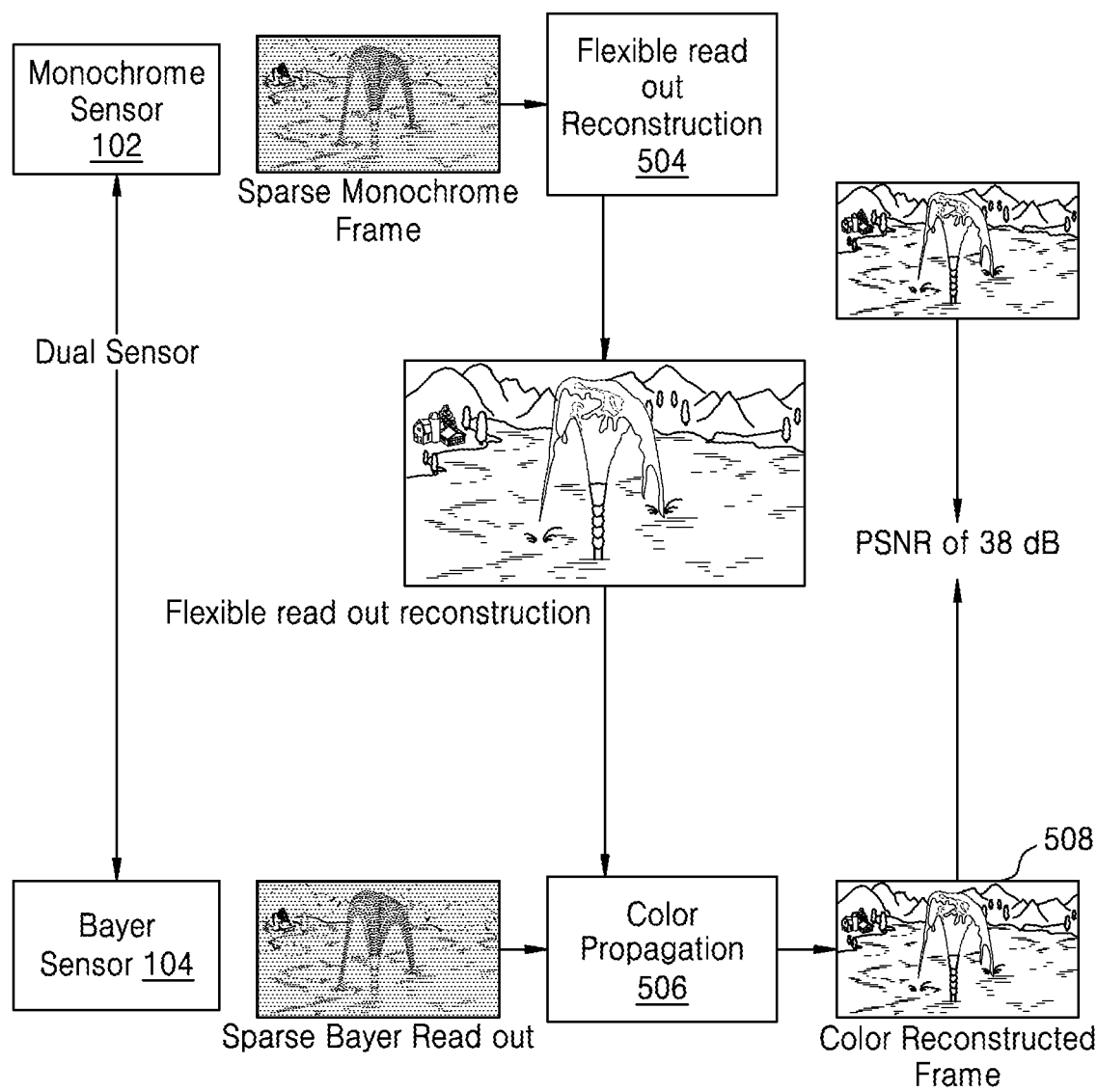
FIG. 5 illustrates a monochrome and color reconstruction, according to an embodiment of the disclosure.

FIG. 5 illustrates a monochrome and color reconstruction, according to an embodiment of the disclosure.

Referring to FIG. 5, similar to FIG. 4, the reconstruction unit 106 implements flexible read out reconstruction on sparse monochrome frames captured by the monochrome sensor 102, in operation 504. The high resolution monochrome frames act as a guide for color propagation to de-mosaiced grayscale frames reconstructed from sparse Bayer data captured by the Bayer sensor 104. The resultant reconstructed frames 508 after color propagation, implemented in operation 506, become high resolution images.

Figure 6:
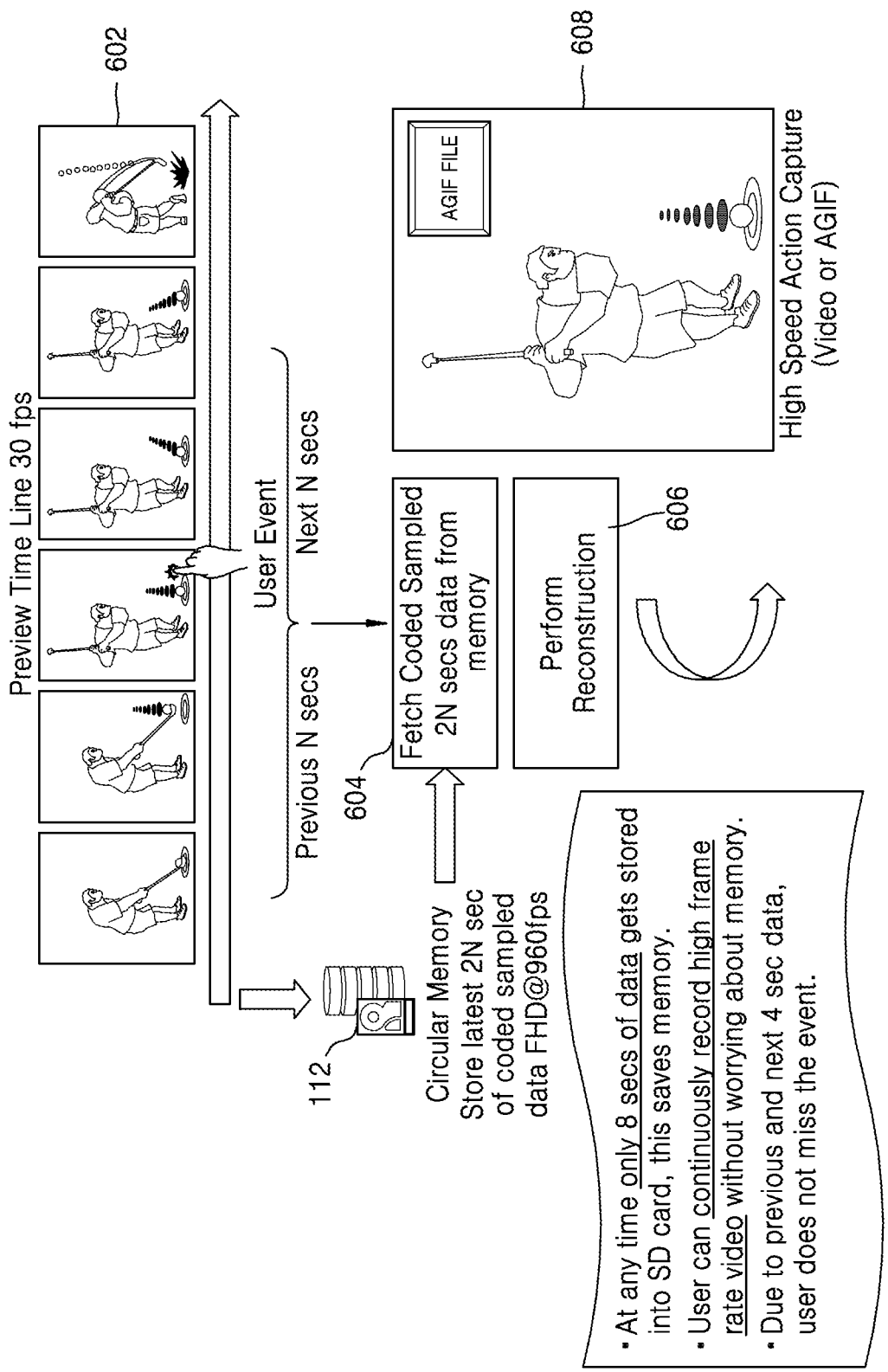
FIG. 6 is an example scenario illustrating high speed high quality video recording, according to an embodiment of the disclosure.

FIG. 6 is an example scenario illustrating high speed high quality video recording, according to an embodiment of the disclosure.

Referring to FIG. 6, FIG. 6 illustrates fetching of a plurality of parity fields for the reconstruction of the high frame rate high resolution video using one of the FSR reconstruction mechanism on the detection of user's event triggering the FSR reconstruction, according to an embodiment of the disclosure. FIG. 6 depicts a preview video frame sequence on the display 108 displayed at 30 fps. From video frames captured by the monochrome sensor 102 and the Bayer sensor 104, the plurality of parity fields are generated and stored on the memory 112.

Further, whenever the user intends to capture video of interest at high frame rate high resolution (FSR mode), the user may use a predefined gesture such as tap on the record icon of a corresponding camera application running in FSR mode. The gesture is detected as a trigger event that triggers the FSR reconstruction mechanism. Once the trigger event is detected, the reconstruction unit 106 fetches the plurality of FHD parity fields currently retained in the memory 112 for a time span of 2N seconds (−N (first set of parity fields) to +N (second set of parity fields)=2N seconds), in operation 604. As depicted in FIG. 6, the 2N seconds span is distributed around the user event with N seconds before and N seconds after the user event. This enables capturing the video of interest more precisely by considering video frames adjacent to these and eliminating any chance of losing a video event of interest 602 due to lags between user action and actual capturing. The plurality of parity fields that do not lie within the time span are discarded due to FIFO action and hence memory space consumed for the plurality of parity fields generated is static even though the FSR mode is enabled in the electronic device 100 for a longer duration. The electronic device 100, through usage of circular memory, reduces consumption of memory by not retaining the undesired high frame rate parity field data. The plurality of parity fields generated continuously, are overwritten over old parity fields data. Each frame of the video event of interest 602 is captured as high resolution monochrome frames and Bayer data and a high resolution video 608 is reconstructed, in operation 606, by using the monochrome frames as a guide for color propagation.

Figure 7:
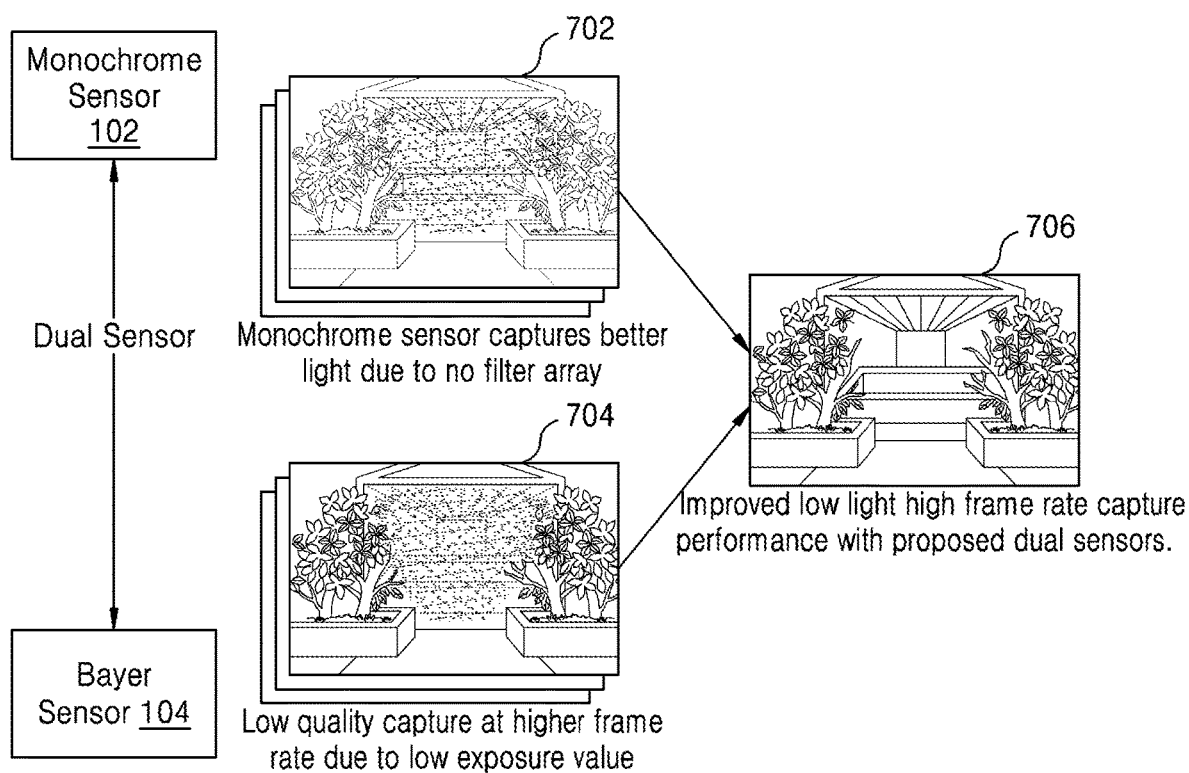
FIG. 7 is an example scenario illustrating capturing high resolution low light images, according to an embodiment of the disclosure.

FIG. 7 is an example scenario illustrating capturing high resolution low light images, according to an embodiment of the disclosure.

Referring to FIG. 7, the monochrome sensor 102 may capture frames 702 at better light due to the absence of a filter array such as an RGB filter array. The Bayer sensor 104 may capture low quality frames 704 in low light. Using the monochrome frames reconstructed using the FSR mechanism, the resultant reconstructed image frames 706 have improved illuminance.

Figure 8:
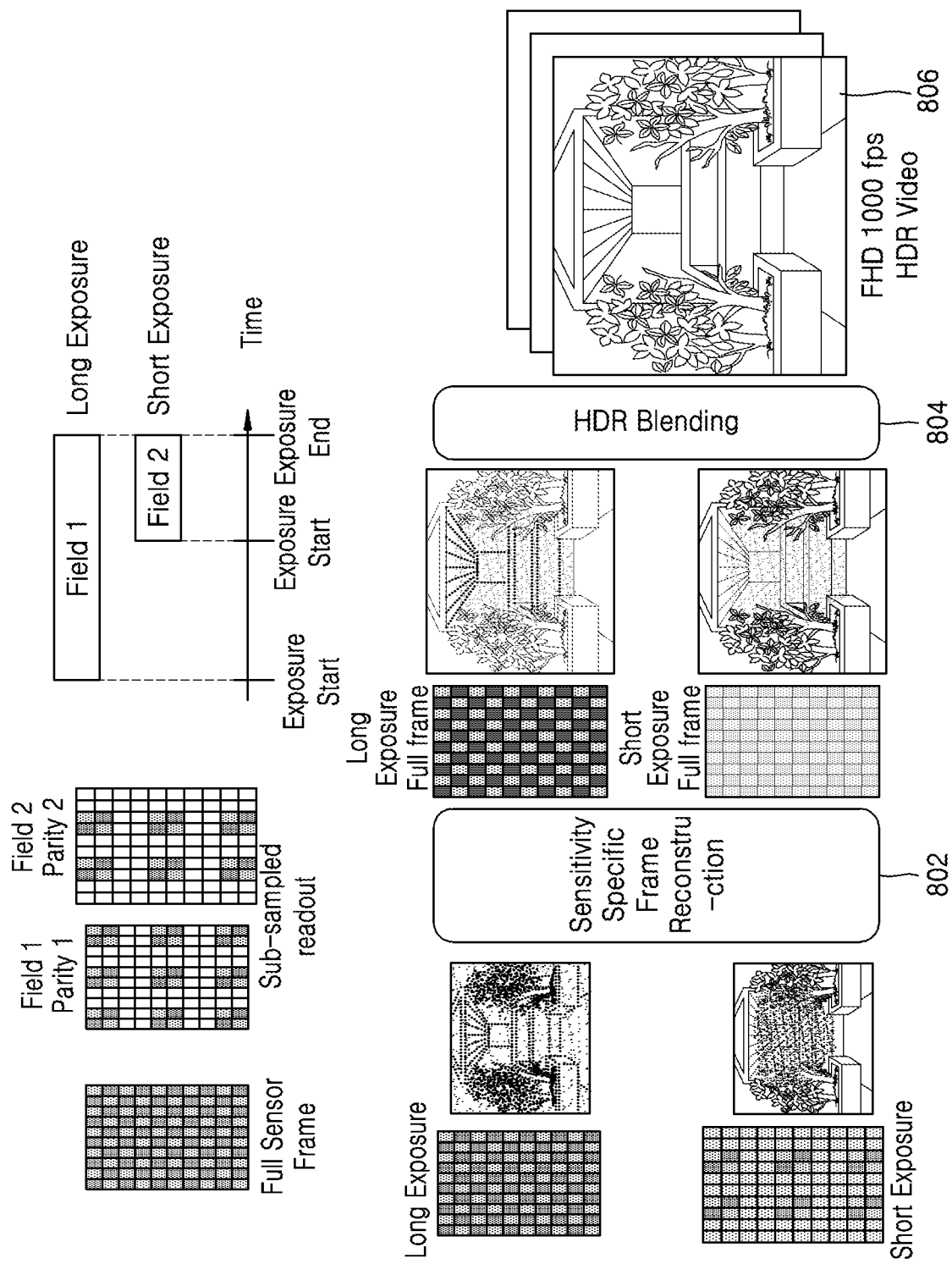
FIG. 8 is an example scenario illustrating high dynamic range (HDR) video recording at a high frame rate, according to an embodiment of the disclosure.

FIG. 8 is an example scenario illustrating high dynamic range (HDR) video recording at high frame rate, according to an embodiment of the disclosure.

Referring to FIG. 8, the usage of dual sensors results in varying exposures. For example, monochrome frames can be captured with a long exposure by the monochrome sensor 102 while the Bayer frames are captured at a relatively shorter exposure. In an embodiment of the disclosure, each of dual sensors adopted in the electronic device 100 have different exposure time and sensitivity, respectively, in capturing images. As shown in FIG. 8, the long exposure frames have greater sensitivity and are used as a guide to reconstruct the Bayer frames. In operation 802, the respective image frames are reconstructed based on the varying sensitivity.

The varying sensitivities are blended during operation 804 to obtain image frames 806 at high dynamic ranges.

Figure 9:
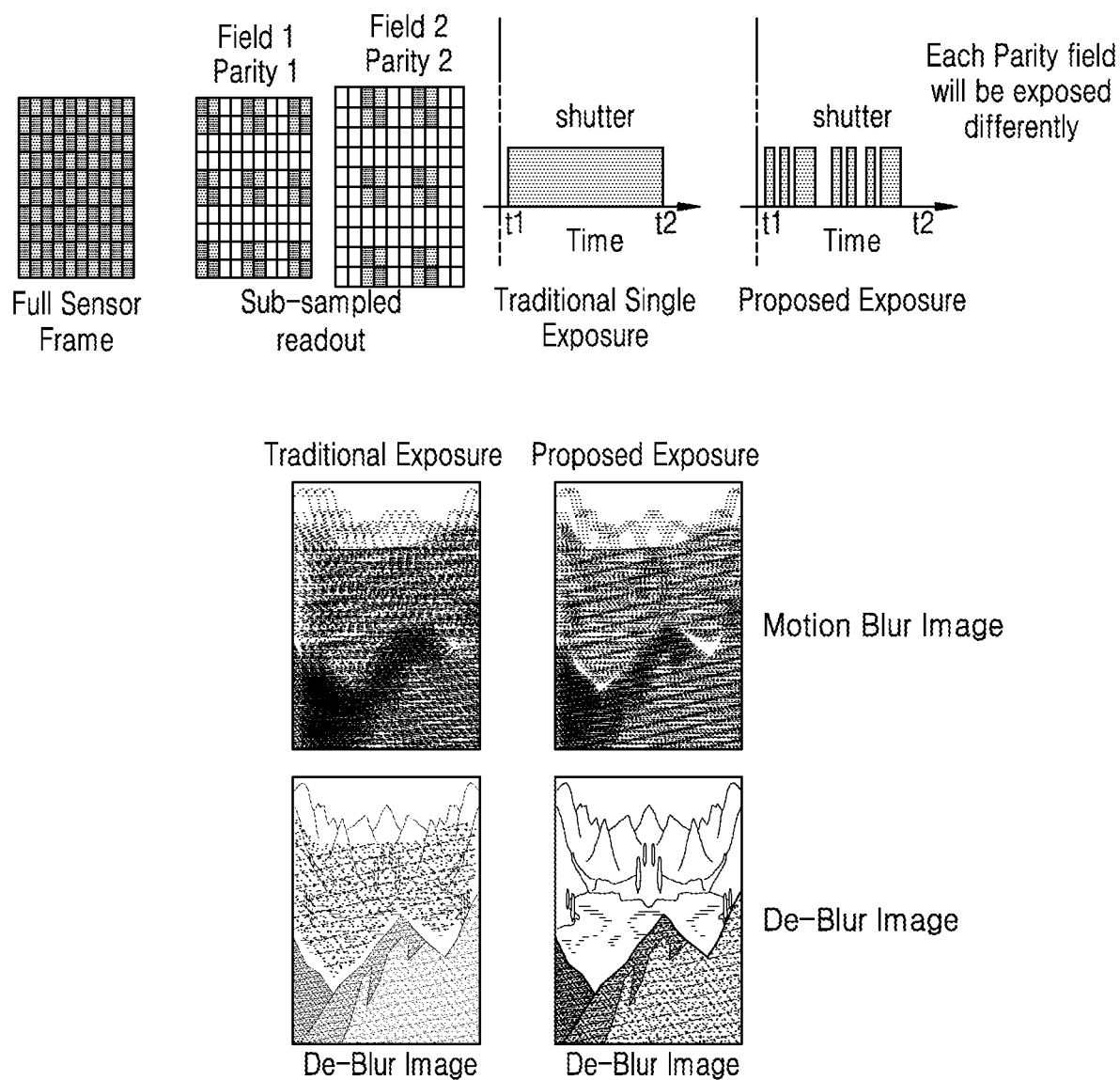
FIG. 9 is an example scenario illustrating high quality motion de-blur, according to an embodiment of the disclosure.

FIG. 9 is an example scenario illustrating high quality motion de-blur, according to an embodiment of the disclosure.

Referring to FIG. 9, motion blur is caused while capturing a moving object from a single exposure camera. In the example scenario, we apply a short exposure chosen with a binary pseudo random sequence. Each parity sub-sampled data is exposed to a short exposure chosen with a binary pseudo random sequence. This coded exposure preserves high frequency spatial details in the blurred image and deconvolution to apply de-blur becomes easy.

Figure 10:
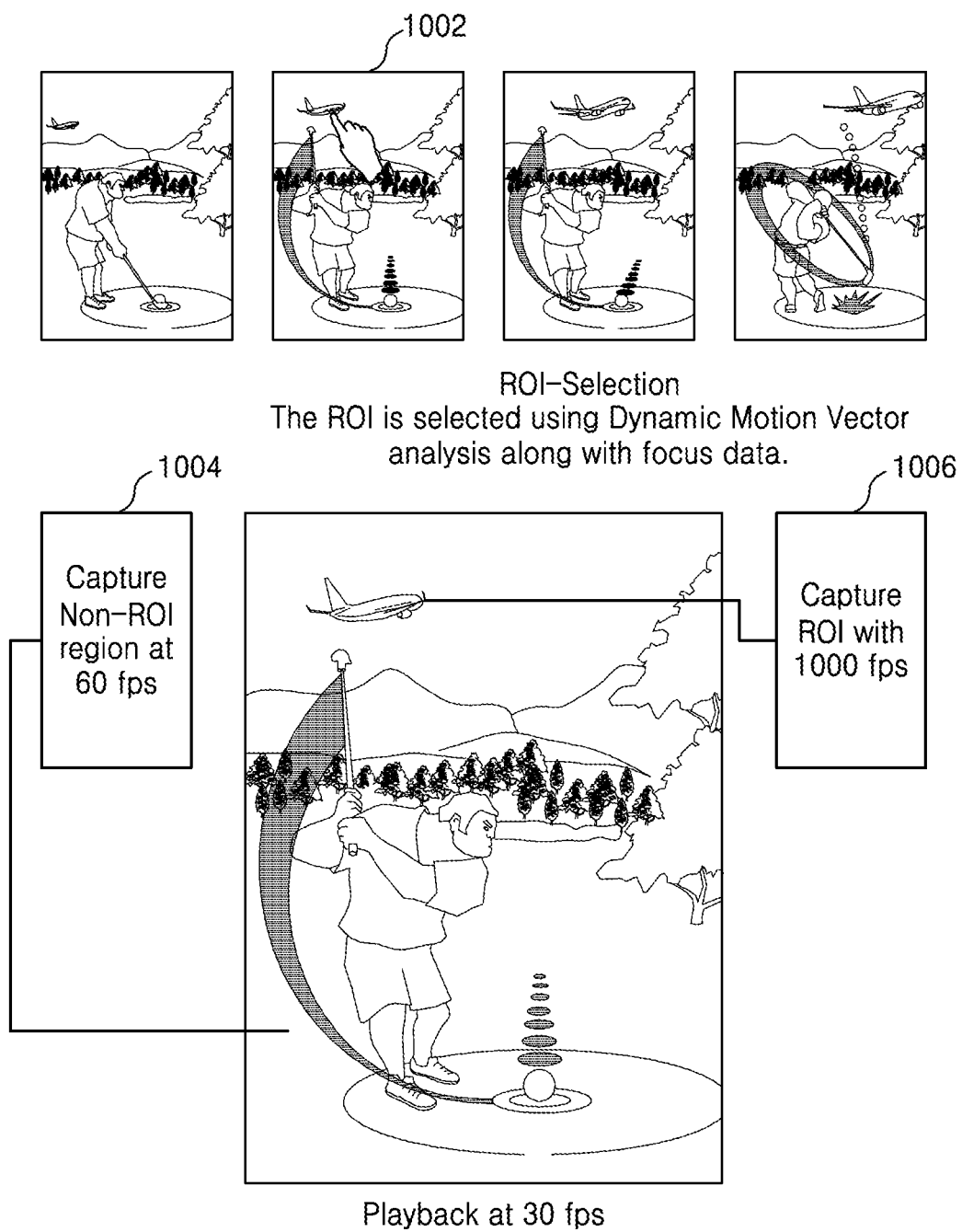
FIG. 10 is an example scenario illustrating differential frame rate video recording, according to an embodiment of the disclosure.

FIG. 10 is an example scenario illustrating differential frame rate video recording, according to an embodiment of the disclosure.

Referring to FIG. 10, FIG. 10 illustrates selective high frame rate capture for only a region of interest (ROI) in the plurality of video frames 1002 being captured, according to an embodiment of the disclosure. In operation 1006, the reconstruction unit 106 captures and reconstructs the high frame rate high resolution video for a ROI of each video frame providing 1000 fps, while in operation 1004 the remaining video frames are captured at a normal or lower frame rate of 30 fps. The mode generates the plurality of parity fields for only the ROI of the monochrome data and the Bayer data. Since only a portion of the video is recorded at a higher frame rate, the bandwidth limitation required in the differential mode is reduced.

The embodiments disclosed herein can be implemented through at least one software program running on at least one hardware device and performing network management functions to control the elements. The elements shown in FIGS. 1-10 include blocks which can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating video data using an imaging device, the method comprising:
    capturing, by a first sensor of the imaging device, a first set of sub-sampled monochrome frames;
    capturing, by a second sensor of the imaging device, a second set of sub-sampled color frames;
    reconstructing one or more high resolution monochrome frames using the first set of sub-sampled monochrome frames and a flexible sub-sampled readout (FSR) mechanism; and
    generating one or more high speed high resolution color frames based on the second set of sub-sampled color frames and the reconstructed one or more high resolution monochrome frames.

2. The method of claim 1, wherein the first sensor and the second sensor have different exposure times and sensitivities, in capturing images.

3. The method of claim 1, wherein the one or more high resolution monochrome frames are used as a guide for color propagation in the one or more high speed high resolution color frames.

4. The method of claim 1,
    wherein a detection of a predefined user gesture triggers the FSR mechanism.

5. The method of claim 1, wherein the second set of sub-sampled color frames is more sparsely sub-sampled than the first set of sub-sampled monochrome frames.

6. The method of claim 1, wherein the reconstructing is initiated based on a user trigger made on at least one of preview images corresponding to the one or more high speed high resolution color frames.

7. The method of claim 1, wherein the first sensor comprises a monochrome sensor and the second sensor comprises a Bayer sensor.

8. The method of claim 7, wherein the monochrome sensor comprises a non-color sensor and the Bayer sensor comprises a color sensor.

9. The method of claim 1,
    wherein reconstructing of the one or more high resolution monochrome frames from the first set of sub-sampled monochrome frames comprises:
        capturing a plurality of parity fields from the first sensor of the imaging device using a multi parity FSR mechanism in an FSR mode; and
        reconstructing the one or more high resolution monochrome frames from the plurality of parity fields using an FSR reconstruction, and
    wherein the FSR reconstruction utilizes one of a pre-image signal processor (ISP) FSR reconstruction and a post-ISP FSR reconstruction based on a bandwidth capacity of a processor included in the imaging device.

10. An imaging device for generating video data, the imaging device comprising:
    a first sensor configured to capture a first set of sub-sampled monochrome frames;
    a second sensor configured to capture a second set of sub-sampled color frames; and
    a processor coupled to the first sensor and the second sensor, the processor being configured to:
        reconstruct one or more high resolution monochrome frames using the first set of sub-sampled monochrome frames and a flexible sub-sampled readout (FSR) mechanism, and
        generate one or more high speed high resolution color frames based on the second set of sub-sampled color frames and the reconstructed one or more high resolution monochrome frames.

11. The imaging device of claim 10, wherein the first sensor and the second sensor have different exposure times and sensitivities, in capturing images.

12. The imaging device of claim 10, wherein the processor is further configured to use the one or more high resolution monochrome frames as a guide for color propagation for the one or more high speed high resolution color frames.

13. The imaging device of claim 10,
    wherein a detection of a predefined user gesture triggers the FSR mechanism.

14. The imaging device of claim 10, wherein the second set of sub-sampled color frames are more sparsely sub-sampled than the first set of sub-sampled monochrome frames.

15. The imaging device of claim 10, wherein the reconstructing is initiated based on a user trigger made on at least one of preview images corresponding to the one or more high speed high resolution color frames.

16. The imaging device of claim 10, wherein the first sensor comprises a monochrome sensor and the second sensor comprises a Bayer sensor.

17. The imaging device of claim 16, wherein the monochrome sensor comprises a non-color sensor and the Bayer sensor comprises a color sensor.

18. The imaging device of claim 10,
wherein the processor is further configured to reconstruct the one or more high resolution monochrome frames from the first set of sub-sampled monochrome frames by:
    capturing a plurality of parity fields from the first sensor of the imaging device using a multi parity FSR mechanism in an FSR mode; and
    reconstructing the one or more high resolution monochrome frames from the plurality of parity fields using an FSR reconstruction, and
wherein the FSR reconstruction utilizes one of a pre-image signal processor (ISP) FSR reconstruction and a post-ISP FSR reconstruction based on a bandwidth capacity of the processor.

19. A non-transitory computer program product comprising a computer readable storage medium having a computer readable program stored therein, the computer readable program, when executed on a computing device, causing the computing device to:
    capture, with a first sensor, a first set of sub-sampled monochrome frames;
    capture, with a second sensor, a second set of sub-sampled color frames;
    reconstruct one or more high resolution monochrome frames using the first set of sub-sampled monochrome frames and a flexible sub-sampled readout (FSR) mechanism; and
    generate one or more high speed high resolution color frames based on the second set of sub-sampled color frames and the reconstructed one or more high resolution monochrome frames.

20. The method of claim 1, wherein the reconstructing of the one or more high resolution monochrome frames using the first set of sub-sampled monochrome frames comprises, reconstructing the one or more high resolution monochrome frames using the first set of sub-sampled monochrome frames in response to a triggering event.

* * * * *